United States Patent Office 3,236,419
Patented Feb. 22, 1966

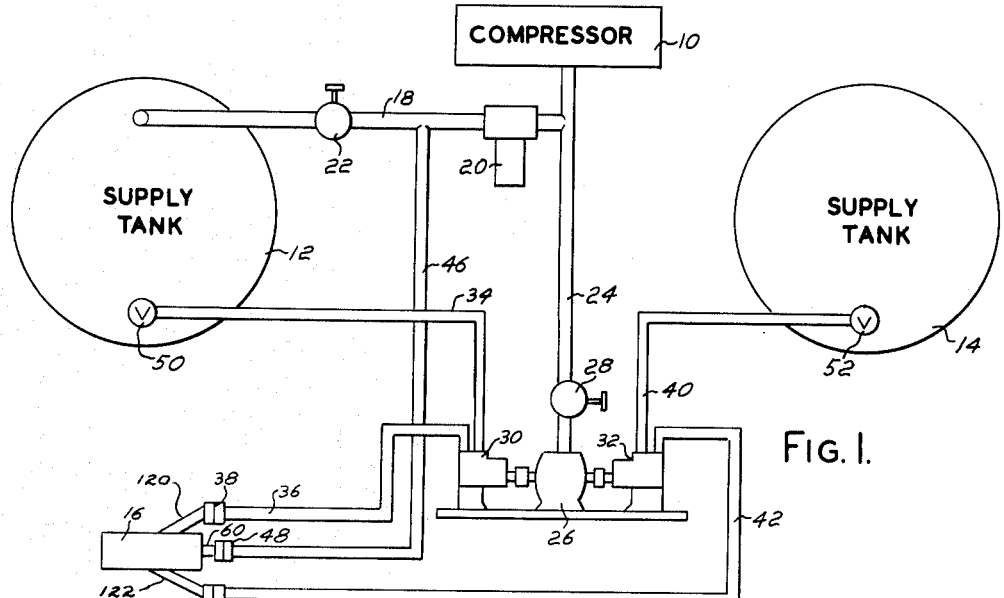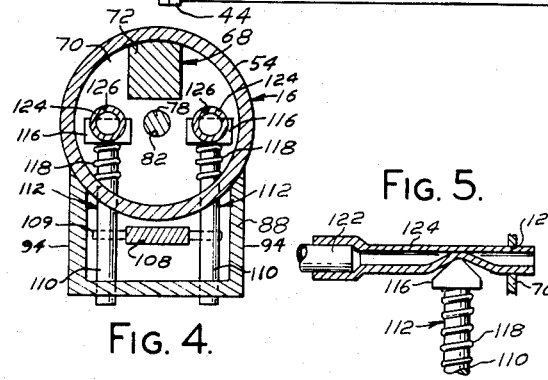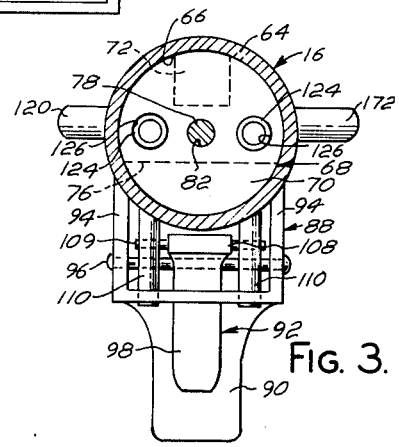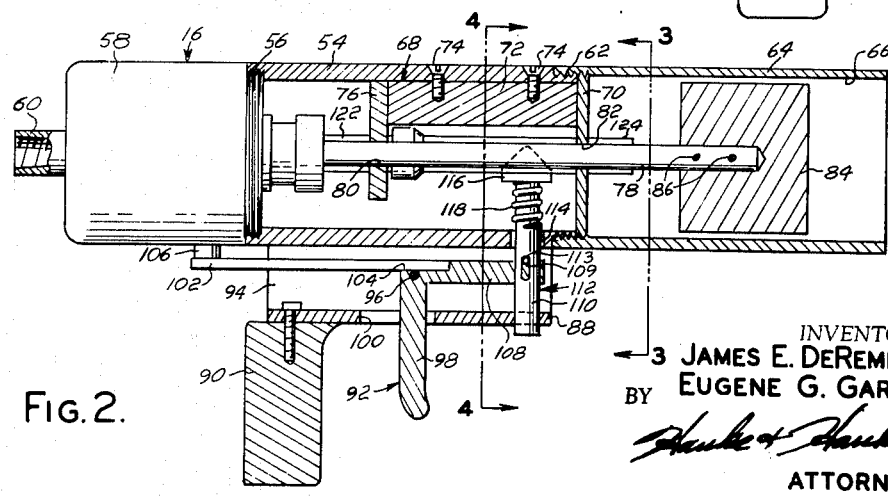

3,236,419
FOAM DISPENSER
James E. De Remer and Eugene George Gardner, both of Toledo, Ohio, assignors to Continental Aviation and Engineering Corporation, Detroit, Mich., and Toledo, Ohio
Filed Feb. 10, 1964, Ser. No. 343,786
11 Claims. (Cl. 222—135)

The present invention relates to dispensing apparatus and more particularly to an improved means for dispensing a plastic foam material such as polyurethane or the like.

In recent years the use of rigid plastic foam materials such as polyurethane and the like has increased tremendously. One important use for such materials has been in the field of packaging where the use of such materials offers a number of important advantages over conventional packages. These advantages are more clearly set forth in copending applications Serial No. 143,210, filed October 5, 1961, and Serial No. 179,115, filed March 12, 1962, now Patent No. 3,124,246, issued March 10, 1964.

Polyurethanes for purposes of the present invention may be broadly defined as the polylmerized reaction products of a polyisocyanate and an organic catalyst substance having two or more reactive hydrogen groups. When the correct proportions of these substances are brought together, a porous polyurethane foam is spontaneously produced through a complex series of chemical and physical reactions which are described in detail in Bayer, German Rubber Chemistry, volume 8. Other reaction aiding components may be added to the mixture if desired as indicated in Bayer.

A common method of producing polyurethanes is to provide means for delivering the prepolymer such as polyisocyanate and the catalyst to a mixing chamber in the proper proportions, providing means for mixing the substances within the chamber and then dispensing the foaming mixture into a container or the like before it hardens.

The mixing and dispensing guns used for this purpose must be cleaned after each use. For this reason these devices have heretofore been provided with means for pumping a suitable solvent through the gun after each use. While this is a generally satisfactory means for cleaning such devices, the components which must be added to the gun to provide such means greatly increases the production and maintenance costs for systems employing such a device.

Further, it is apparent that valve means must be provided which enable the operator to quickly and completely cut off delivery of the substances to the mixing chamber to prevent excessive overflows caused by the expanding foam. The problem with such valves is that they must be located closely adjacent the mixing chamber and they must be simple enough in operation and construction to minimize interference of operation which may be caused by adherence of the foam to operating parts of the valves.

It is an object of the present invention to improve plastic foam dispensing apparatus by providing a dispensing device for such apparatus having those parts exposed to the plastic foam readily removable for cleaning and replacement.

It is another object of the present invention to reduce the cost of manufacturing and maintaining dispensing apparatus for plastic foam substances such as polyurethane and the like by providing an economically constructed reliable dispensing device for such apparatus.

It is still another object of the present invention to improve the operation of plastic foam dispensing apparatus by providing a novel valving means for the dispensing device of such apparatus.

Still further objects and advantages will readily occur to one skilled in the art to which the present invention pertains upon reference to the following description and to the following drawings in which like reference characters refer to like parts throughout the several views and in which FIG. 1 is a diagrammatic view of a preferred dispensing system of the present invention.

FIG. 2 is a longitudinal cross sectional view of a preferred dispensing device of the present invention.

FIG. 3 is a lateral cross sectional view as seen substantially from line 3—3 of FIG. 2.

FIG. 4 is a lateral cross sectional view as seen substantially from line 4—4 of FIG. 2, and FIG. 5 is a fragmentary detail view of a preferred valve member of the present invention.

Description

Now referring to the drawings for a more detailed description of the present invention, FIG. 1 illustrates diagrammatically a preferred system of the present invention as comprising a compressor 10, a pressurized supply tank 12, a second supply tank 14 and a dispenser 16. The supply tank 12 preferably carries a suitable catalyst and is pressurized to aid in preventing Freon gas loss and the supply tank 14 preferably carries a suitable prepolymer.

The pressurized supply tank 12 is preferably connected to the compressor 10 by conduit 18. An air filter 20 and a pressure regulator 22 are provided in the conduit 18 intermediate the compressor 10 and the pressurized supply tank 12. The air filter 20 is provided to keep water out of the system. The compressor 10 delivers compressed air through a conduit 24 to drive a double shafted air motor 26. A pressure regulator 28 is preferably provided in the conduit 24. The air motor 26 is drivingly connected to fluid pumps 30 and 32.

The pump 30 has its inlet side connected to the supply tank 12 by conduit 34 and its outlet side connected by conduit 36 to an inlet fitting 38 carried by the dispenser 16. The pump 32 has its inlet side connected to the supply tank 14 by conduit 40 and its outlet side connected by conduit 42 to an inlet fitting 44 carried by the dispenser 16. A branch conduit 46 connects the conduit 18 downstream of the air filter 20 with an air inlet fitting 48 carried by the dispenser 16. The fittings 38, 44 and 48 are preferably of the quick disconnect type commonly in use so the dispenser 16 can be readily disconnected from the rest of the system. The conduits 34 and 40 are preferably provided with shut off valves 50 and 52 respectively.

Now referring to FIGS. 2–5 for a more detailed description of the dispenser 16, it is therein illustrated as comprising a substantially cylindrical housing 54. The housing 54 is preferably internally threaded as at 56 to carry an air motor 58. The air motor 58 is provided with an air inlet 60 connected with the inlet fitting 48. The opposite end of the housing 54 is reduced and externally threaded as at 62 to carry a cylindrical nozzle member 64. The nozzle member 64 defines a mixing chamber 66.

A support member 68 is provided with a forward plate portion 70 abutting the end of the housing 54 and substantially closing the mixing chamber 66 from the interior of the housing 54. The support member 68 is preferably secured in position by an elongated portion 72 secured to the housing 54 as by screws 74. A rear plate portion 76 is carried by the elongated portion 72 and extends into the interior of the housing 54.

The air motor 58 is provided with an elongated drive shaft 78 extending through the interior of the housing 54 and terminating within the mixing chamber 66. The shaft 78 is rotatably supported by aligned perforations 80 and 82 respectively provided in the rear plate portion 76 and the forward plate portion 70 of the support member 68. The free end of the shaft 78 is axially slotted to receive a flat mixing blade 84. Screws 86 secure the blade 84 to the shaft 78.

As can best be seen in FIGS. 3 and 4, a U-shaped bracket 88 is secured to the exterior of the housing 54. A handle 90 is secured to and extends below the bracket 88. A trigger assembly 92 is pivotally secured to the side walls 94 of the bracket 88 by an elongated pivot pin 96. The trigger assembly 92 is provided with a trigger portion 98 extending downwardly through an elongated slot 100 provided in the bracket 88. The trigger assembly 92 further comprises an actuating arm 102 secured within a recess 104 provided in the trigger portion and extending to a position engaging an on-off switch 106 for the air motor 58. A forward extension 108 of the trigger assembly 92 is pivotally connected by a pivot pin 109 to the valve stems 110 of a pair of valve members 112. An elongated slot 113 is provided in each of the valve stems 110 so that as the trigger assembly 92 is pivoted about the pin 96, an axial movement of the valve stems 110 is produced.

The valve stems 110 extend upwardly through suitable openings 114 provided in the housing 54. Wedge members 116 are carried on the free ends of the valve stems 110. A spring 118 is biased between the wedge member 116 and the housing 54 on each of the valve members 112 to urge the valve members 112 to their uppermost axial position.

The inlet fittings 38 and 44 are connected with inlet conduits 120 and 122 respectively which extend into the interior of the housing 54 from opposite sides thereof. A resilient tubing member 124 is carried on the end of each of the inlet conduits 120 and 122 and is supported by openings 126 provided in the forward plate portion 70 and the rear plate portion 76 of the support member 68. The free ends of the tubing members 124 are disposed within the mixing chamber 66. As can best be seen in FIG. 5, the wedge members 116 of the valve member 112 engage with a portion of the tubing members 124 so that as the trigger assembly 92 is pivoted to move the valve members 112 axially inwardly, the wedge members 116 compress the tubing members 124 to close flow therethrough. Pivoting of the trigger assembly 92 to close the tubular members 124 also causes the actuating arm 102 to be pivoted to a position which shuts off the air motor 58 through the switch 106.

In operation, a suitable prepolymer and a suitable catalyst are supplied to dispenser 16 from the supply tanks 12 and 10 respectively by means of the compressor 10, the air motor 26 and the pumps 30 and 32. It is preferred to pressurize the supply tank 12 to aid in moving the viscous catalyst through the conduit 34. With the trigger assembly 92 pivoted to a position moving the wedge members 116 away from the tubular members 124, the catalyst and prepolymer will flow through the tubular members 124 and into the mixing chamber 66. The switch 106 will be actuated by the arm 102 to cause the air motor 58 to operate so that as the substances flow into the mixing chamber 66 they will be thoroughly mixed by the blade 84 before being dispensed from the open end of the nozzle 64.

One important advantage of the dispenser 16 of the present invention is the relative ease with which it can be cleaned. The plastic foam will adhere to the parts of the dispenser with which it comes into contact and therefore it is important that the dispensers of this type be cleaned after each operation. Heretofore the common method of performing this task has been to pump a cleaning solvent of some type through the dispenser. This requires that additional conduits be connected to the dispenser making it difficult to use. Further, such a means does not thoroughly clean the dispenser and requires the system be purged of solvent before it is ready for re-use.

To overcome this problem, the present invention provides a nozzle member 64 and a blade member 84 which are readily removable for cleaning or replacement. These are the only portions of the dispenser 16 which ordinarily come into contact with the mixed substances so these will ordinarily be the only members which need be cleaned. It has been found that by using the air motor 58, sufficient air escapes from the motor 58 and into the interior of the housing 54 that the space is pressurized during operation of the dispenser 16. This prevents the mixed substances from entering this area and interfering with the operation of the motor 58 and the valve members 112.

It is apparent that the valve members 112 provide a reliable yet economically constructed means of shutting off flow of the substances to the mixing chamber 66.

It is also apparent that although we have described but one embodiment of the present invention, many changes can be made therein without departing from the spirit of the invention as expressed by the appended claims.

We claim:

1. In a system for mixing and dispensing a plastic foam such as polyurethane or the like and having means for separately storing two or more substances to be mixed, a dispensing means and means delivering said substances from said storing means to said dispensing means, said dispensing means comprising,
    (a) a housing having inlets connected with said delivery means,
    (b) a mixing chamber and resilient tubular members connecting said inlets with said mixing chamber,
    (c) valve means selectively movable between a first position compressing said tubular members to close flow therethrough and a second position releasing said tubular members to permit flow therethrough,
    (d) a mixing blade rotatingly carried in said mixing chamber,
    (e) means carried by said housing selectively operable to rotate said mixing blade,
    (f) means for actuating said rotating means, and
    (g) means operably connecting said actuating means and said valve means to acuate said rotating means only when said valve means are moved to said second position.

2. The dispensing device as defined in claim 1 and in which said rotating means comprises an air motor having a drive shaft extending through said housing and said mixing blade is removably secured to the free end of said drive shaft.

3. A device for receiving at least two substances, mixing the substances and dispensing the substances in mixed form, said device comprising,
    (a) a tubular housing member having an inlet for each of the substances to be mixed,
    (b) a nozzle member removably carried at one end of said housing and defining a mixing chamber,
    (c) motoring means carried by said tubular housing and having a drive shaft extending into said chamber,
    (d) a mixing blade removably carried at the free end of said shaft,
    (e) a resilient compressible tubular member connecting each of said inlets with said mixing chamber,
    (f) valve members axially slidably carried by said housing and axially movable to positions respectively engaging and compressing said tubular members,
    (g) a trigger assembly pivotally carried by said housing and pivotally connected with said valve members whereby pivoted movement of said trigger assembly with respect to said housing produces axial movement of said valve members to open and close flow through said resilient tubular members, (h) supporting means secured to said housing and comprising a pair of spaced plate members supporting said resilient tubular members,
(i) one of said plate members substantially closing communication between the interior of said housing member and said mixing chamber, and
(j) means pressurizing the interior of said housing.

4. The device as defined in claim 3 and in which said valve members engage said resilient tubular members intermediate said plate members.

5. The device as defined in claim 3 and including switch means for said motoring means and in which said trigger assembly includes an actuator arm operably engaging said switch to shut off said motoring means upon said valve members being moved to a closed position.

6. A device for receiving at least two substances, mixing the substances and dispensing the substances in mixed form, said device comprising,
(a) a tubular housing member having an inlet for each of the substances to be mixed,
(b) a nozzle member removably carried at one end of said housing and defining a mixing chamber,
(c) motoring means carried by said tubular housing and having a drive shaft extending into said chamber,
(d) a mixing blade removably carried at the free end of said shaft,
(e) a resilient compressible tubular member connecting each of said inlets with said mixing chamber,
(f) valve members axially slidably carried by said housing and axially movable to positions respectively engaging and compressing said tubular members,
(g) a trigger assembly pivotally carried by said housing and pivotally connected with said valve members whereby pivoted movement of said trigger assembly with respect to said housing produces axial movement of said valve members to open and close flow through said resilient tubular members,
(h) supporting means secured to said housing and comprising a pair of spaced plate members supporting said resilient tubular members,
(i) switch means for said motoring means, and
(j) said trigger assembly including an actuator arm operably engaging said switch means to shut off said motoring means upon said valve members being moved to a closed position.

7. A device for receiving at least two substances, mixing the substances and dispensing the susbtances in mixed form, said device comprising,
(a) a tubular housing member having an inlet for each of the substances to be mixed,
(b) a nozzle member removably carried at one end of said housing and defining a mixing chamber,
(c) motoring mean carried by said tubular housing and having a drive shaft extending into said chamber,
(d) a mixing blade removably carried at the free end of said shaft,
(e) a resilient compressible tubular member connecting each of said inlets with said mixing chamber,
(f) valve members axially slidably carried by said housing and axially movable to positions respectively engaging and compressing said tubular members,
(g) a trigger assembly pivotally carried by said housing and pivotally connected with said valve members whereby pivoted movement of said trigger assembly with respect to said housing produces axial movement of said valve members to open and close flow through said resilient tubular members,
(h) switch means for said motoring means, and
(i) said trigger assembly including an actuator arm operably engaging said switch means to shut off said motoring means upon said valve members being moved to a closed position.

8. In a system for mixing and dispensing a plastic foam such as polyurethane or the like and having means for separately storing two more substances to be mixed, a dispensing means and means delivering said substances from said storing means to said dispensing means, said dispensing means comprising,
(a) a housing having inlets connected with said delivering means,
(b) a mixing chamber and at least two resilient tubular members extending substantially parallel and connecting said inlets with said mixing chamber,
(c) valve means comprising a wedge member disposed adjacent each of said resilient tubular members and movable between a first position compressing said tubular members to close flow therethrough and a second position releasing said tubular members to permit flow therethrough, and
(d) means for actuating said valve means to move said wedge members simultaneously to either said first position or said second position whereby each of said tubular members are either both open to flow or are both closed to flow.

9. The dispensing device as defined in claim 8 and including a mixing blade rotatingly carried in said mixing chamber and means carried by said housing selectively operable to rotate said mixing blade.

10. The device as defined in claim 9 and in which said rotating means includes a shaft extending substantially parallel to and intermediate said tubular members and having said mixing blade fixed to the free end thereof.

11. The device as defined in claim 8 and including spring means urging said wedge members toward said first position.

References Cited by the Examiner
UNITED STATES PATENTS

| | | | |
|---|---|---|---|
| 1,981,077 | 11/1934 | Shields | 239—373 X |
| 2,073,779 | 3/1937 | Bramsen | 239—142 X |
| 2,356,865 | 8/1944 | Mason | 239—527 X |
| 2,402,826 | 6/1946 | Lubbock | 222—135 X |
| 2,511,626 | 6/1950 | Einbecker | 239—304 X |
| 2,946,488 | 7/1960 | Kraft | 222—334 X |
| 2,958,516 | 11/1960 | Wall et al. | 259—8 |
| 2,970,818 | 2/1961 | Kish et al. | 222—135 X |
| 2,985,192 | 5/1961 | Taylor et al. | 251—7 X |
| 3,012,977 | 12/1961 | Wilson et al. | 259—7 X |
| 3,102,004 | 8/1963 | Grintz | 259—7 X |

RAPHAEL M. LUPO, *Primary Examiner.*